March 26, 1935.  G. W. CLARK  1,995,794

BICYCLE WHEEL MOUNTING

Original Filed Feb. 27, 1934

INVENTOR
GEORGE W. CLARK
BY Chapin & Neal
ATTORNEYS

Patented Mar. 26, 1935

1,995,794

UNITED STATES PATENT OFFICE 1,995,794

BICYCLE WHEEL MOUNTING

George W. Clark, Westfield, Mass., assignor to The Westfield Manufacturing Company, Westfield, Mass., a corporation of Massachusetts Application February 27, 1934, Serial No. 713,136
Renewed September 4, 1934

5 Claims. (Cl. 208—101)

This invention relates to an improved mounting for the wheels of bicycles and has for its principal object the provision of a mounting of this character which will hold the wheels firmly in the fork members of the frame and at the same time insulate the frame from road shocks and vibrations. A further object is to provide a mounting of this character so arranged as to facilitate assembly of the wheels in the frame. Other and further objects and advantages of the invention will be apparent from the following specification and claims.

In the accompanying drawing, which illustrates one embodiment of the invention—

Figure 1:
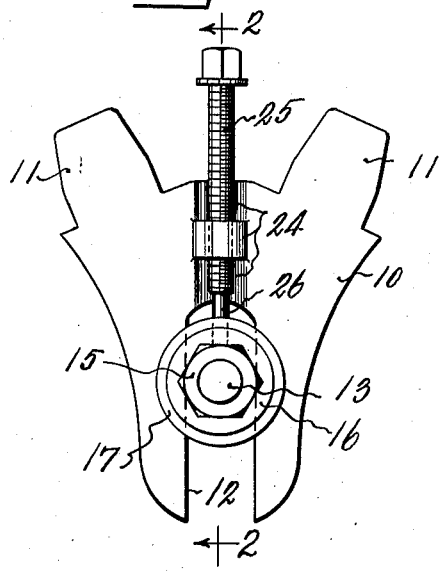
Fig. 1 is a side view showing the mounting assembled in the rear fork member of the bicycle frame, with only those parts shown which are desirable to understanding my disclosure.
Figure 2:
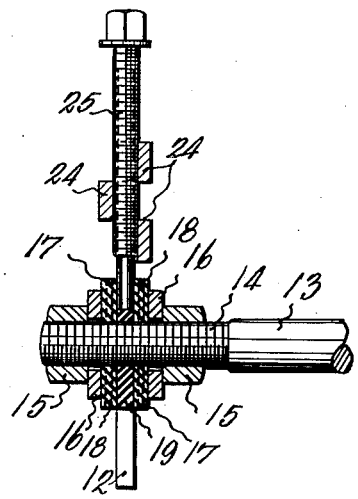
Fig. 2 is a section substantially on line 2—2 of Fig. 1.
Figure 3:
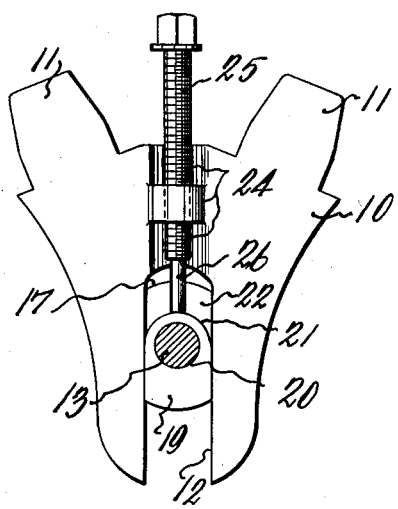
Fig. 3 is a view similar to Fig. 1 but with parts broken away.

Referring to the drawing, 10 indicates one of the end members of the rear fork of a bicycle frame. The member 10 illustrated is in the form of a stamped plate having lugs 11 by which the plate is connected to the frame and an open-ended slot 12 which receives one end of the shaft 13 upon which the rear wheel of the bicycle is rotatably mounted in a well known manner. The ends of shaft 13 are threaded as indicated at 14 and the shaft is adapted to be held in longitudinally adjusted position by means of nuts 15 positioned on opposite sides of fork member 10. Positioned between each nut and the plate is a metal washer 16 and a rubber insulating member 17 engaging the plate 10 and adapted to be compressed between the plate and washer 16 by the tightening of the adjacent nut. In the form shown, the insulating members 17 comprise annular washer-like members formed of rubber and reenforcing layers of fabric 18, embedded in and vulcanized in the rubber. The width of the slot 12 is somewhat greater than the diameter of the shaft 13 and a third insulating member 19 is inserted in the slot 12, as best shown in Fig. 3. Member 19 is formed of rubber and fabric in like manner as members 17 and, as will be seen from the latter figure and Fig. 2, member 19 is of a width and thickness to snugly fill the slot 12 without substantial compression of the rubber. Member 19 is provided with an opening 20 through which shaft 13 passes. The radial dimension of the member 19 in the direction of the open end of the slot is substantially that of the outer radius of the annular members 17. Towards the closed end of the slot 12, member 19 is cut away, as indicated at 21, forming a recess 22 between members 17. The members 10 are provided with oppositely struck-out portions 24 interiorly threaded to receive an adjusting screw 25 having a reduced end 26 adapted to pass into recess 22 and engage member 19 in substantially diametrical alignment with the shaft 13. The screw 25 itself functions in a well known manner to assist in adjusting the position of the rear wheel so that it will run true between the forks and in proper relation to the driving sprocket and chain.

Figure 4:
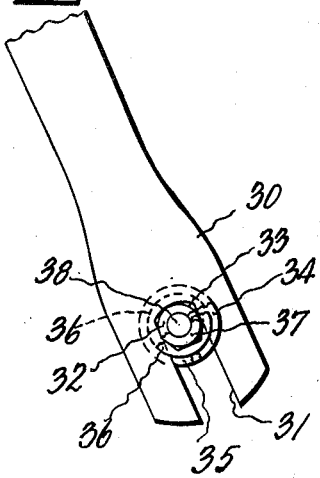
Fig. 4 is a view similar to Fig. 1 but showing the mounting assembly at the front fork of the bicycle.

In the application of the mounting to a front fork, as shown in Fig. 4, the end of each front fork member 30 is formed with a downwardly opening slot 31 in which the central insulating member 32 snugly fits. Member 32 is similar in all respects to member 19 previously described but is of somewhat small dimensions. The upper curved end 33 of member 32 is set in engagement with the closed end of slot 31. The side insulating members 34 and 35 engage, and are compressed tightly against the sides of the fork members through metal washers 36 by nuts 37 threaded on shaft 38 of the front wheel in a manner entirely similar to that previously described with respect to the rear wheel mounting, and with equal and equivalent advantages.

The advantages of my shock absorbing elements thus applied to either or both axle mountings are as follows: The way of holding the axles in adjusted position is essentially the same as is customarily used in the prior art except that the axles are mounted to float on rubber. The rubber parts are placed as shown, so that the strains of bicycle use are transmitted as they have been before and to the same rugged parts of the frame that will stand up under the strain, but there is no possibility of rattles even when the parts loosen up a bit, and the load transmission to the frame from the wheels in driving or bouncing the bicycle up and down is always through one or more of the rubber parts at the axle connections.

In the preferred form of the invention, as shown, it is an advantage to have the parts 19 and 32, which bear the vertical loads and need a nice fitting position with the fork, separate from the rubber side members 17, 34, and 35, which bear the side thrusts. The metal parts which back up the side members can be tightened up, as much as desired, without distorting the parts 19 and 32. While if the parts were all in one piece it would not be possible to tighten up the side members without distorting the vertical load bearing member, and such distortion would have a tendency to move the axles out of adjustment. As shown, the axles can be kept in exact adjustment, although they are mounted in rubber. The pressure from the side members can not transmit side thrust pressure to distort the member in which the axle rests for its vertical load. The separation of the side members by the metal of the fork, which is substantially the same thickness as members 19 and 32, brings about this independence of rubber parts that is highly desirable. The arrangement of the parts is simple and snug, close fitting and efficient, in the same way that the customary axle mounting is, but with the added advantage that the axles literally float on rubber without danger of getting out of adjustment by the compression and elasticity of the rubber.

I claim:

1. A shock insulating mounting for securing a bicycle wheel in the fork of a bicycle frame which comprises an insulating member fitting within an open-ended slot formed in the end of the fork member and of a thickness substantially equal to the thickness of the slot walls, an opening in said insulating member through which the end of the shaft of the wheel passes, metal washers positioned on said shaft on opposite sides of the fork member, additional shock insulating means interposed between the washers and the adjacent sides of the fork member and nuts threaded on said shaft and adapted to engage the washers and compress the intervening shock insulating means against the sides of the fork member to hold the shaft tightly and non-rotatably in said slot.

2. A shock insulating mounting for securing a bicycle wheel in the fork of a bicycle frame which comprises an insulating member fitting within an open-ended slot formed in the end of the fork member and of a thickness substantially equal to the thickness of the slot walls, an opening in said insulating member through which the end of the shaft of the wheel passes, metal washers positioned on said shaft on opposite sides of the fork member, independent annular insulating members positioned between the washers and the adjacent side of the fork member and nuts threaded on said shaft and adapted to compress said annular insulating members against the sides of the fork member to hold the shaft tightly and non-rotatably in said slot.

3. A shock insulating mounting for securing a bicycle wheel in the fork of a bicycle frame which comprises an elongated elastic insulating member fitting within an open-ended slot formed in the end of the fork member and of a thickness substantially equal to the thickness of the slot walls, an opening formed in the upper portion of said insulating member through which the end of the shaft of the wheel passes, metal washers positioned on said shaft on opposite sides of the fork member, independent annular insulating members positioned between the washers and the adjacent side of the fork members, the radial dimensions of said elongated and annular insulating members being such that their lower edges coincide and the upper edges of the annular members overlap the upper edge of the elongated member to form a recess within which the fork structure at the closed end of the slot engages, and nuts threaded on said shaft and adapted to compress the annular insulating members against the sides of the fork member to hold the shaft tightly and non-rotatably in said slot.

4. A shock-cushioning mounting for securing a bicycle wheel in the fork of a bicycle frame which comprises a non-metallic cushioning member made of yielding material such as rubber, said member being positioned within an open-ended slot formed in the end of the fork member, an opening in said cushioning member through which the end of the shaft of the wheel passes with a snug fit, metal washers positioned on said shaft on opposite sides of the fork member and nuts threaded on said shaft and adapted to engage the washers to hold the shaft tightly, and non-rotatably in said slot whereby the shaft is cushioned in all radial directions.

5. In a wheel mounting for a bicycle the combination of a frame element having an opening, a wheel shaft extending through the opening, washers and nuts located on opposite sides of the opening, and non-metallic shock cushioning means made of yielding material such as rubber, said member being positioned in the opening and adapted to be held in shock-cushioning relation with the shaft by pressure exerted by the washers and nuts.

GEORGE W. CLARK